Oct. 1, 1929.                S. U. CARON                1,729,760
                              VENTILATOR
                         Filed Sept. 30, 1926
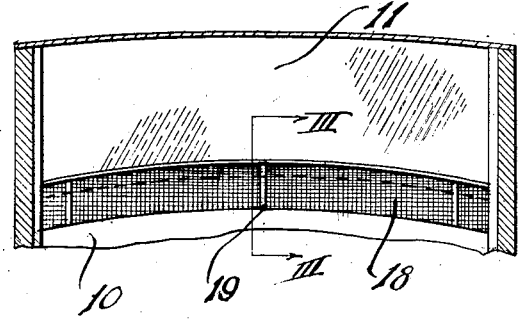
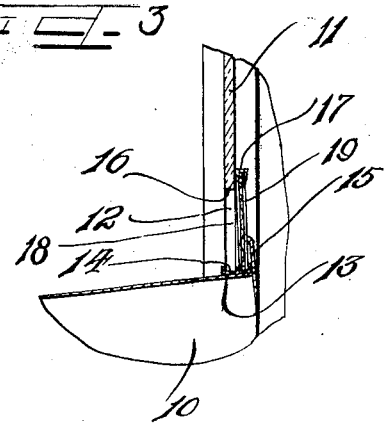
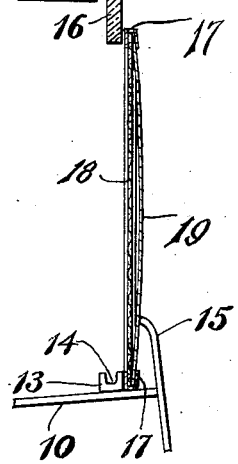
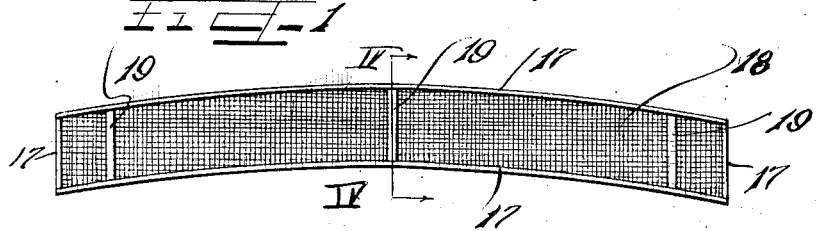
Inventor
Samuel U. Caron
By Charles W. Hill Attys Patented Oct. 1, 1929

1,729,760

UNITED STATES PATENT OFFICE

SAMUEL U. CARON, OF CHICAGO, ILLINOIS

VENTILATOR

Application filed September 30, 1926. Serial No. 138,592.

This invention relates to ventilator devices and more particularly to screen closures for vehicles, although it may be used with equal advantage for other purposes.

It contemplates more especially the provision of a detachable screen closure which may be readily associated with a vehicle windshield or similar device to prevent the introduction therein of undesirable substances prevalent in the atmosphere.

Vehicles traverse at considerable speeds which accumulate foreign substances, including pests and bugs, prevalent in the atmosphere, especially when the windshield is elevated to admit air therein. To avoid the introduction of these undesirable substances, novel means are provided to permit the introduction of air without the foreign substances customarily carried therein.

One object of the present invention is to provide a simple and inexpensive device for preventing the introduction of undesirable substances in vehicles or similar objects when the windshields thereof are raised or otherwise adjusted to admit air.

Another object is to provide means for effectively maintaining a screen or other detachable device in operative position.

Other objects and advantages will appear from the following description of an illustrated embodiment of the present invention.

In the drawings:

Figure 1 is a view in elevation of a device embodying features of the present invention.

Figure 2 is a fragmentary view in elevation of a vehicle section having a device such as shown in Figure 1 associated therewith.

Figure 3 is a sectional view taken substantially along line III—III of Figure 2.

Figure 4 is a sectional view taken substantially along line IV—IV of Figure 1.

The structure selected for illustration is shown associated with a vehicle 10 of standard construction, which is provided with the usual windshield 11 adapted to be elevated or otherwise adjusted to admit air within the vehicle, in this instance, through the space 12 defined by the elevated windshield 11 and the hood of the vehicle 10. It is universal practice to provide a weather strip 13 having a depression which is pasted or otherwise secured on the hood to define an arcuate trough 14 terminating in an upstanding portion 15 integral with the body 10 and disposed adjacent the confronting correspondingly shaped edge 16 of the windshield 11, preferably composed of glass, adapted to be lowered in contacting engagement with the weather strip 13 to effect a hermetic or at least water proof seal therebetween.

In order to prevent the introduction of undesirable substances within the vehicle through the open space 12 prevalent when the windshield 11 is elevated, a ventilator of novel construction is detachably associated with the body 10 and windshield 11 to effect a screened closure for the space 12 which is bridged thereby. The screen, in this instance, comprises a metallic frame 17 composed of strips of sheet material bent upon itself to define a U-shaped trough to facilitate the reception of the screening material therein. Obviously, the strips 17 may be shaped in any appropriate manner so that when the extremities thereof are secured together in the usual manner, a frame of any desired configuration will be formed. As shown, the frame is shaped to provide a pair of parallel spaced arcuate sides which conform in curvature to the trough 13, as well as to the edge 16 of the windshield so that it may be readily associated therewith as will be apparent from the showing in Figure 3. Screening material 18 preferably of fine mesh, is secured within the frame constituting the strips 17 to define a closure for the space 12, supra. The screening is preferably of metallic construction and is held within the strip 17 in any suitable manner, such as by pinching the edges thereof or by denting as is common in the art. To enable the screen closure 18 to be readily associated with the body 10 and windshield 11, yieldable means are provided to maintain the screen in operative position adjacent the trough 14 in contacting engagement with the windshield 11, it being supported by the inclined wall of the upstanding portion 15 which terminates in the trough 13. The yieldable means, in this instance, comprises a plurality of spaced metallic strips 19, in this instance three, which are normally bowed (Figure 4) to provide a resilient support which contact, in this instance, with the upstanding portion 15 to yieldably urge the closure 18 against the weather strip 13 and the windshield 11 when the lower arcuate edge 17 thereof is in abutting relation with the trough 14. The strips 19 are preferably secured at their extremities to the frame of a closure, they being somewhat longer than the width of the frame to present the normally bowed formation hereinabove described. It is evident that other yieldable means may be provided to effectively support the closure which bridges, in this instance, the space 12 for the purpose set forth.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a vehicle body having means forming a depressed portion for receiving an abutting edge of a windshield, of a windshield receivable within and arranged to be spaced from said depressed portion, a screen associated with said depressed portion for bridging the space between the vehicle body and windshield, and yieldable means mounted on said screen adapted to abut an upstanding portion of said vehicle body to maintain said screen in operative position, said yieldable means including a normally bowed resilient strip fixed to said screen.

2. The combination with a vehicle body, of opposed spaced members thereon defining a channel, a screen adapted to enter said channel and between said opposed members, and outstanding normally bowed resilient strips on said screen, said outstanding bowed strips being adapted to yieldingly abut one of said opposed members to maintain said screen in operative position abutting the other of said opposed members.

In testimony whereof I have hereunto subscribed my name.

SAMUEL U. CARON.